United States Patent
Harvey et al.

(10) Patent No.: US 11,873,686 B2
(45) Date of Patent: Jan. 16, 2024

(54) SYSTEM, METHOD AND APPARATUS FOR DOWNHOLE TORQUE-TRANSFERRING BALL SCREW

(71) Applicant: General Downhole Tools, Ltd., Calgary (CA)

(72) Inventors: Michael Harvey, Calgary (CA); David Devlin, Calgary (CA); Jovan Vrcar, Calgary (CA)

(73) Assignee: GENERAL DOWNHOLE TOOLS, LTD., Calgary (CA)

( * ) Notice: Subject to any disclaimer, the term of this patent is extended or adjusted under 35 U.S.C. 154(b) by 0 days.

(21) Appl. No.: 18/110,116

(22) Filed: Feb. 15, 2023

(65) Prior Publication Data

US 2023/0295991 A1 Sep. 21, 2023

Related U.S. Application Data

(60) Provisional application No. 63/320,741, filed on Mar. 17, 2022.

(51) Int. Cl.
   *E21B 17/07*   (2006.01)
   *F16F 15/10*   (2006.01)

(52) U.S. Cl.
   CPC ............ *E21B 17/07* (2013.01); *E21B 17/073* (2013.01); *F16F 15/10* (2013.01)

(58) Field of Classification Search
   CPC ......... E21B 17/07; E21B 17/073; F16F 15/10
   See application file for complete search history.

(56) References Cited

U.S. PATENT DOCUMENTS

| 3,156,106 A | 11/1964 | Crane |
| 3,339,380 A | 9/1967 | Fox |

(Continued)

FOREIGN PATENT DOCUMENTS

| BR | 112013002850 | 6/2016 |
| CA | 2805845 | 2/2012 |

(Continued)

OTHER PUBLICATIONS

Notification of Transmittal of the International Search Report and the Written Opinion of the International Searching Authority, or the Declaration dated May 11, 2023 (dated May 11, 2023), issued on the related International patent application PCT/CA2023/050202 by the Canadian Intellectual Property Office.

(Continued)

*Primary Examiner* — Tara Schimpf
*Assistant Examiner* — Lamia Quaim
(74) *Attorney, Agent, or Firm* — Dickinson Wright PLLC

(57) ABSTRACT

A downhole tool has a main body that is cylindrical and includes a top coupling that couples to a drill string. A second body that is cylindrical is positioned at least partially within the main body. The second body has a bottom coupling that couples to a drill bit. Springs are positioned within the downhole tool and transmit an axial force to the drill bit. A first set of grooves is formed on an interior of the main body, and a second set of grooves is formed on an exterior of the second body. Balls travel within the first and second sets of grooves. At least some of the balls simultaneously engage the main body and the second body.

16 Claims, 8 Drawing Sheets

(56) References Cited

U.S. PATENT DOCUMENTS

| | | | | |
|---|---|---|---|---|
| 3,345,832 | A | * | 10/1967 | Bottoms ............... E21B 17/07 464/21 |
| 3,871,193 | A | | 3/1975 | Young |
| 3,898,815 | A | * | 8/1975 | Young .................. E21B 17/07 285/302 |
| 3,947,008 | A | | 3/1976 | Mullins |
| 3,949,150 | A | | 4/1976 | Mason et al. |
| 4,186,569 | A | | 2/1980 | Aumann |
| 4,281,726 | A | | 8/1981 | Garrett |
| 4,434,863 | A | | 3/1984 | Garrett |
| 4,552,230 | A | | 11/1985 | Anderson et al. |
| 4,709,462 | A | | 12/1987 | Perkin et al. |
| 4,901,806 | A | | 2/1990 | Forrest |
| 7,044,240 | B2 | | 5/2006 | McNeilly |
| 7,654,344 | B2 | | 2/2010 | Haughom et al. |
| 8,561,499 | B1 | | 10/2013 | Schiemann et al. |
| 9,109,410 | B2 | | 8/2015 | Swietlik et al. |
| 9,334,698 | B2 | | 5/2016 | Hansen |
| 10,533,376 | B2 | | 1/2020 | Reimers |
| 2007/0284148 | A1 | * | 12/2007 | Wassell ............... E21B 44/00 175/371 |
| 2012/0228029 | A1 | | 9/2012 | Reimers |
| 2012/0303534 | A1 | | 11/2012 | Keller et al. |
| 2013/0206482 | A1 | | 8/2013 | Reimers |
| 2014/0262650 | A1 | | 9/2014 | Eppink |
| 2017/0204684 | A1 | | 7/2017 | Cravatte et al. |
| 2017/0342781 | A1 | | 11/2017 | Reimers |
| 2018/0100357 | A1 | * | 4/2018 | Christopher ........ E21B 17/028 |

FOREIGN PATENT DOCUMENTS

| | | |
|---|---|---|
| CA | 2966485 | 8/2016 |
| CN | 102140893 | 8/2011 |
| CN | 203937147 | 11/2014 |
| CN | 203937148 | 11/2014 |
| CN | 203937149 | 11/2014 |
| CN | 110199083 | 9/2019 |
| CN | 209747234 | 12/2019 |
| CN | 209880268 | 12/2019 |
| CN | 210052584 | 2/2020 |
| CN | 210052585 | 2/2020 |
| DE | 2217223 | 10/1972 |
| DK | 19682041 | 6/1974 |
| EP | 3169865 | 5/2017 |
| GB | 1382702 | 2/1975 |
| GB | 2435386 | 8/2007 |
| GB | 2439177 | 12/2007 |
| GB | 2439178 | 12/2007 |
| GB | 2443362 | 6/2008 |
| GB | 2495660 | 4/2013 |
| GB | 2549004 | 10/2017 |
| IE | 36266 | 9/1976 |
| IN | 332113 | 2/2012 |
| JP | 55077510 | 6/1980 |
| JP | 57009634 | 1/1982 |
| NO | 322144 | 8/2006 |
| NO | 324265 | 9/2007 |
| NO | 324981 | 1/2008 |
| NO | 325253 | 3/2008 |
| NO | 20101108 | 2/2012 |
| NO | 340896 | 8/2016 |
| NO | 20150131 | 8/2016 |
| NO | 343669 | 5/2019 |
| NO | 20180821 | 5/2019 |
| RO | 129038 | 11/2013 |
| RO | 129776 | 9/2014 |
| RO | 134045 | 4/2020 |
| TW | 200806199 | 2/2008 |
| TW | I322671 | 2/2008 |
| TW | M413424 | 10/2011 |
| WO | 2004090278 | 10/2004 |
| WO | 2006075921 | 7/2006 |
| WO | 2007049968 | 5/2007 |
| WO | 2012018261 | 2/2012 |
| WO | 2012121608 | 9/2012 |
| WO | 2016122329 | 8/2016 |

OTHER PUBLICATIONS

Notification of Transmittal of the International Search Report and the Written Opinion of the International Search Authority or the Declaration dated May 11, 2023 (dated May 11, 2023) issued on related international patent application PCT/CA2023/050202 by the Canadian Intellectual Property Office.

* cited by examiner

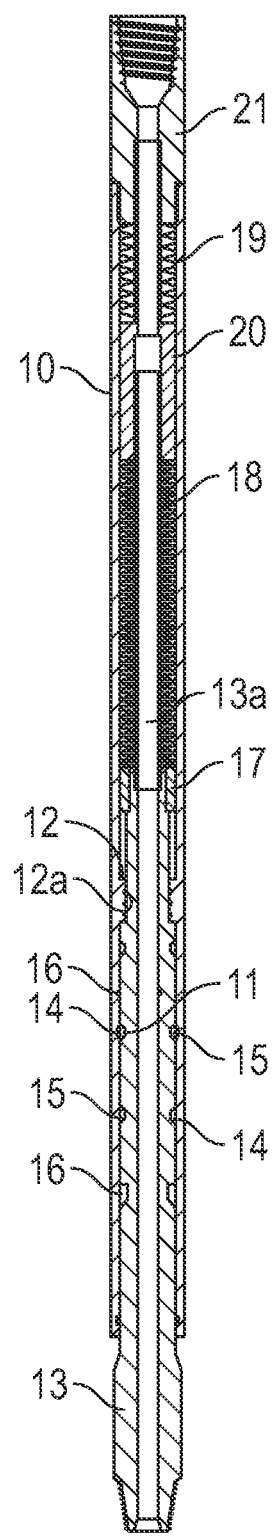 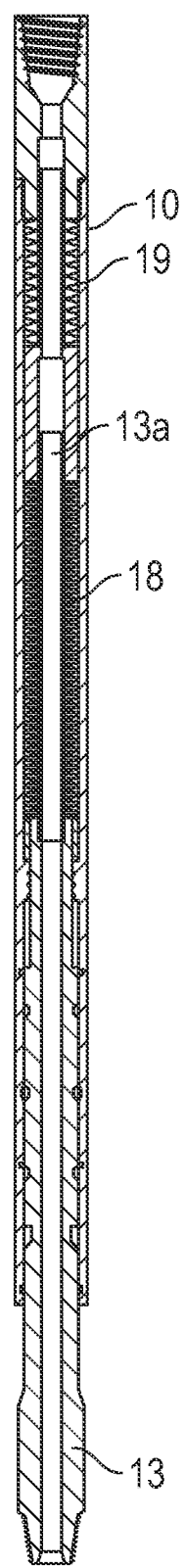
FIG. 1A
FIG. 1B

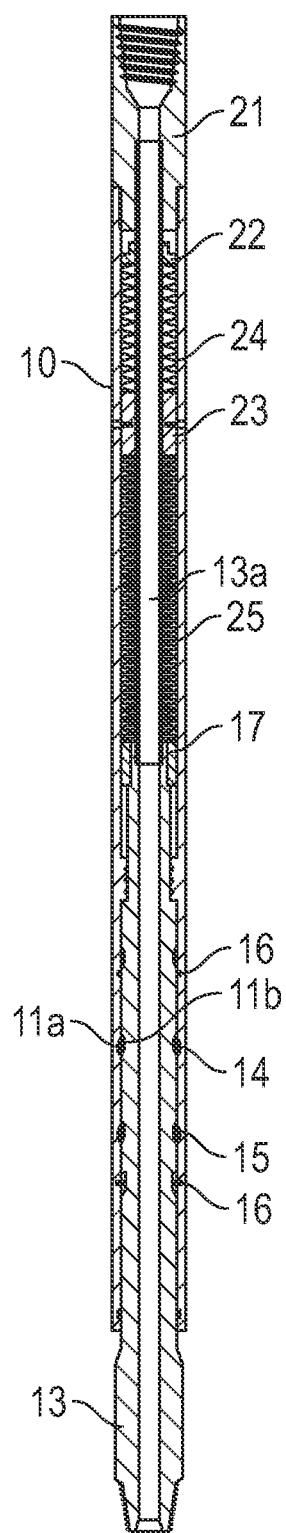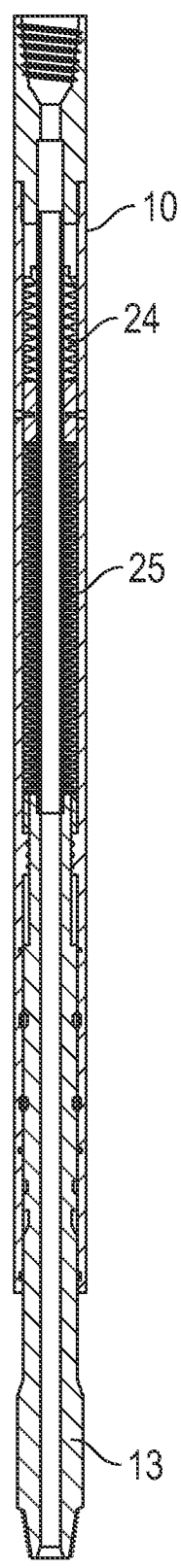
FIG. 2A
FIG. 2B

SYSTEM, METHOD AND APPARATUS FOR DOWNHOLE TORQUE-TRANSFERRING BALL SCREW

CROSS-REFERENCE TO RELATED APPLICATION

This patent application claims priority to and the benefit of U.S. Prov. Pat. App. No. 63/320,741, filed Mar. 17, 2022, which is incorporated herein by reference in its entirety.

TECHNICAL FIELD

This disclosure relates generally to technological improvements in the field of downhole tools used in well drilling and, in particular, to downhole drilling equipment.

BACKGROUND

Conventional techniques for performing drilling operations in an oil or gas well include deploying a drill string with a cutting element, or drill bit, into a wellbore. The drill string or bottom hole assembly (BHA) may contain a variety of components including tools suitable for performing various functions related to the drilling operation. Downhole tools may include one or more dampening elements for reducing torsional shock or excessive vibration of the drill string and drill bit. Such equipment can reduce or eliminate sticking and jerking of the drill bit or drill string and associated damage. Although there are conventional solutions to address these issues, improvements in dampening components continue to be of interest.

SUMMARY

In general, the present disclosure describes a downhole tool and methods of using a downhole tool apparatus for dampening torsional shock and vibration. One aspect of the present disclosure relates to an apparatus for use as part of a drill string within a well. The downhole tool has an outer cylindrical body and an inner cylindrical body positioned at least partially within the outer cylindrical body. One or more grooves are formed in an exterior surface of the inner cylindrical body. A set of balls are located within the one or more grooves and are in contact with an interior surface of the outer cylindrical body. According to some embodiments, the grooves may be configured for recirculation of the balls. Some embodiments may include a fluidic diode for dampening axial motion. According to some embodiments, springs may hold the balls in place.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings. All of this content forms a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' also include plural versions unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in direct physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings.

FIG. 1A is a sectional side view of a downhole tool in a retracted position, according to some embodiments of this disclosure.

FIG. 1B is a sectional side view of the downhole tool of FIG. 1A in an extended position, according to some embodiments of this disclosure.

FIG. 2A is a sectional side view of another configuration of a downhole tool in a retracted position, according to some embodiments of this disclosure.

FIG. 2B is a sectional side view of the downhole tool of FIG. 2A in the extended position, according to some embodiments of this disclosure.

DETAILED DESCRIPTION

Embodiments of a downhole tool and methods of using a downhole tool system for dampening torsional shock and vibration are presented. FIGS. 1 through 8, discussed below, and the various embodiments used to describe the principles of this disclosure are by way of illustration only and should not be construed in any way to limit the scope of the disclosure.

Figure 4:
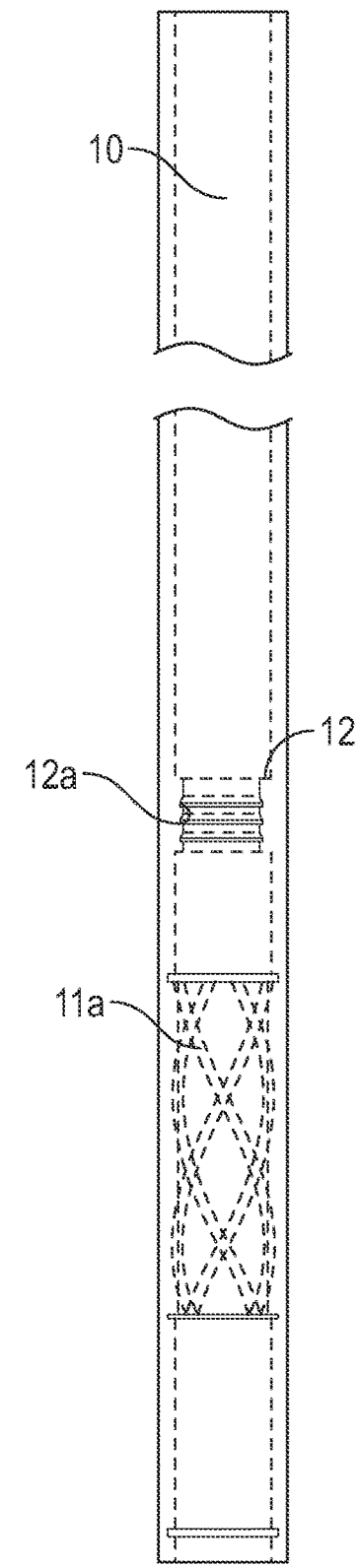
FIG. 4 is a sectional side view of an outer tubular body of a downhole tool, according to some embodiments of this disclosure.
Figure 5A:
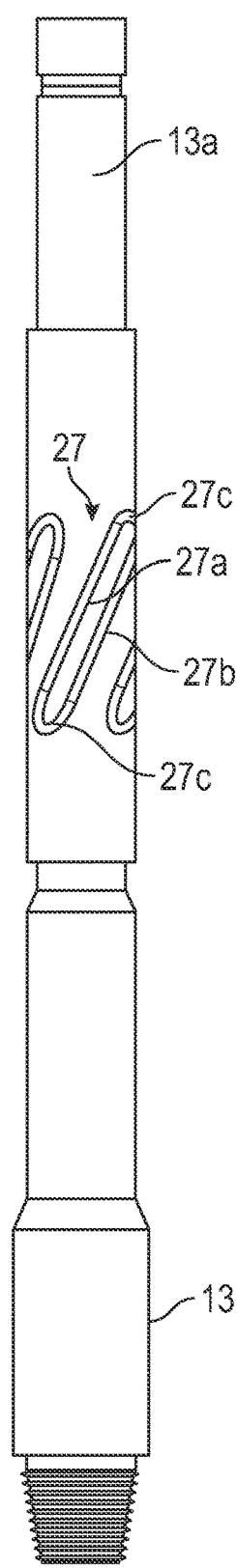
FIG. 5A is a side view of an inner tubular body of a downhole tool, according to some embodiments of this disclosure.
Figure 5B:
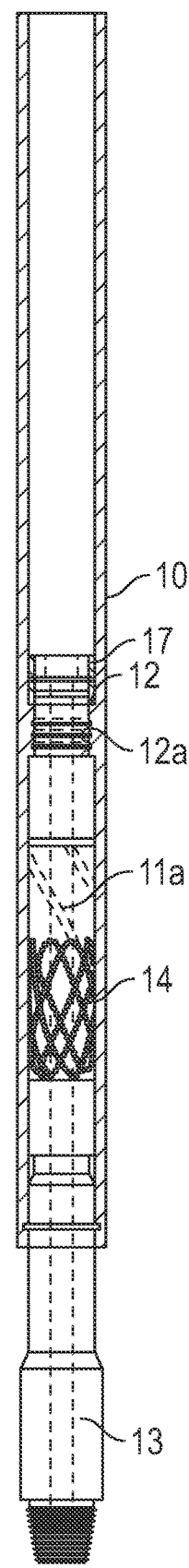
FIG. 5B is a sectional side view of a downhole tool having an inner tubular body with closed loop grooves for recirculation of balls, in an extended position relative to an outer tubular body with grooves, according to some embodiments of this disclosure.
Figure 5C:
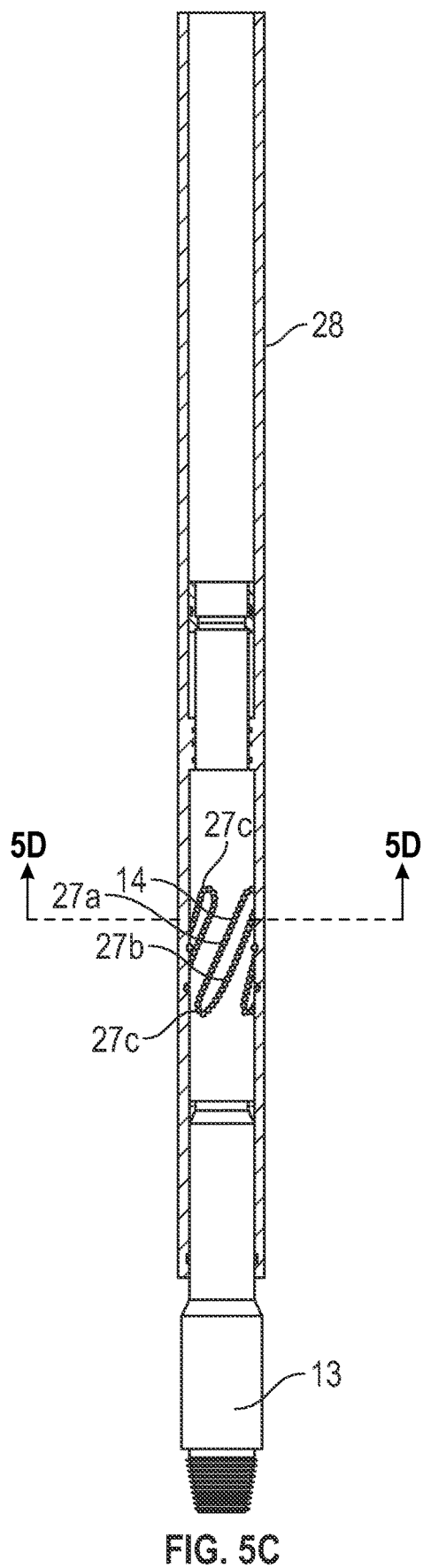
FIG. 5C is a partial sectional side view of the downhole tool of FIG. 5B, in a retracted position, according to some embodiments of this disclosure.
Figure 5D:
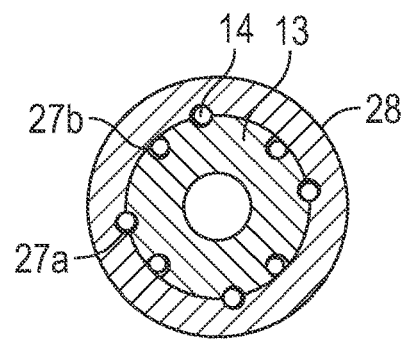
FIG. 5D is sectional view of the downhole tool of FIG. 5C, taken along the line 5D-5D in FIG. 5C, according to some embodiments of this disclosure.

The tool can include an outer tubular body 10, according to some embodiments, with one or more inner grooves 11a (FIGS. 2A, 4 and 5B). For example, in some embodiments the outer tubular body 10 can have four of the inner grooves 11a. The outer tubular body 10 also has an internal shoulder 12 with a fluidic diode 12a (FIGS. 1A 5B and 6B) adjacent to the shoulder 12. The shoulder 12 limits the upward and downward axial travel of inner tubular body 13, according to some embodiments.

The fluidic diode 12a, is sometimes known as a "Tesla valve" or diode. Analogous to a car suspension, the fluidic diode 12a can provide dampening of an oscillating spring. Similarly, this design can provide free fluid flow in compression of the tool, and can dampen fluid flow in the rebound direction. In other words, the fluidic diode 12a can allow substantially free flow of a fluid in one direction through the fluidic diode 12a, while restraining backflow in the opposite direction. Various specific fluidic diode properties may be desirable for particular settings, thus allowing for the fine tuning of such properties through design or selection of the specific diode, as one having ordinary skill in the art would recognize.

In some embodiments, the outer tubular body 10 can include at least one spring, such as the two spring assemblies 18 and 19 shown in FIG. 1A. For example, the spring assemblies 18, 19 can comprise Belleville disc springs that can configured for their stiffness and stroke based on how they are stacked in the tool. The spring assemblies 18, 19 can be arranged with one or more sliding couplings 20 to act, for example in the same axial direction. This design can employ a spacer to put more preload on the springs. In addition, the spacer can vary in thickness, thus providing a customizable load curve on the drilling assembly.

Figure 7:
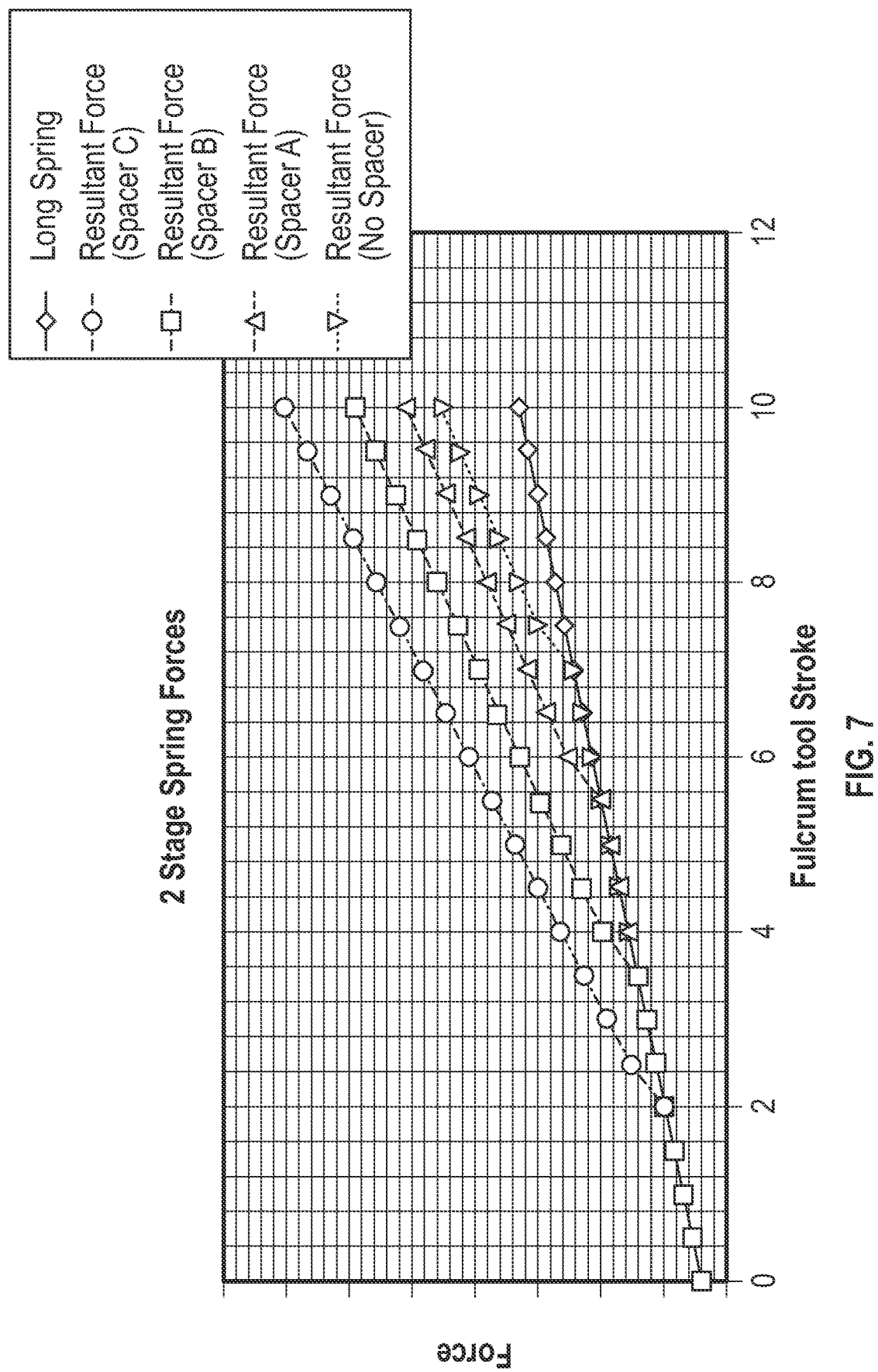
FIGS. 7 and 8 depict graphs of the performance of various types of springs for a downhole tool based on stroke length and force, according to some embodiments of this disclosure.
Figure 8:
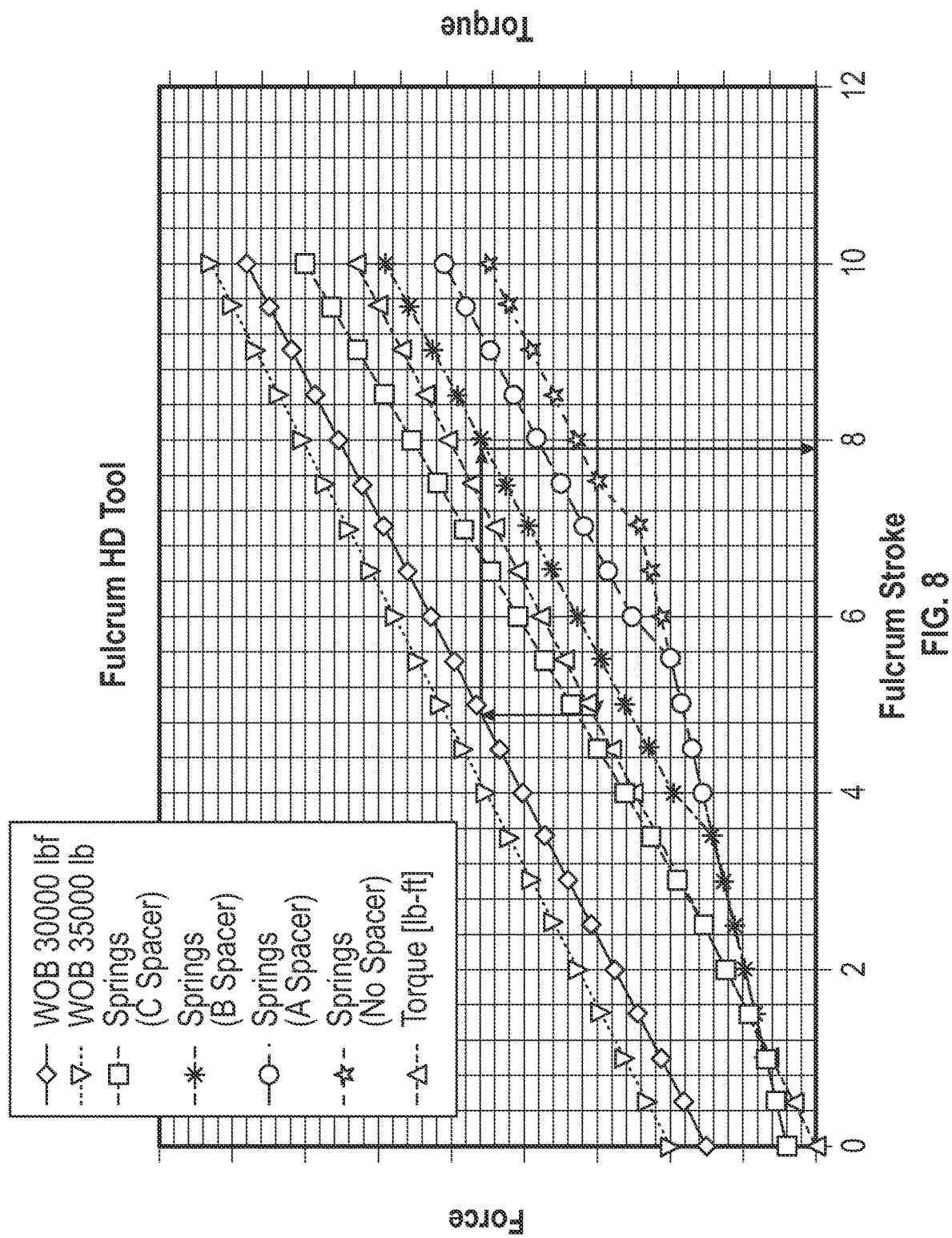

Versions of the spring customization are depicted in FIGS. 7 and 8. The examples depicted in those graphs can be for a tool having a selected outer diameter, with optional disc springs, instead of other springs, in the main (long) spring, and a second (short) spring assembly; a main (long) disc springs, with omitted spacer ring; a second (short) disc springs, with omitted spacer ring. The graphs depict the total spring forces with and without a spacer. Other sizes, configurations and springs also may be used depending on the application.

In other embodiments (FIG. 2A), the outer tubular body 10 may include upper and lower spring assemblies 24 and 25. Different springs can be used in the upper section versus the lower section of the tool. For example, they can have different thicknesses depending on the desired behavior of the tool for different drilling conditions. Again, FIGS. 7 and 8 provide various examples.

Versions of the spring assemblies can be arranged with a fixed collar 23 and a retainer 22 coupled to an inner tubular body extension 13a. The fixed collar 23 can provide a preload on the lower and upper springs. The fixed collar 23 can compress the spring between two bodies. The spacers can further compress the springs to add more preload. The retainer 22 can comprise seals that retain fluid, such as oil. The fixed collar 23 and retainer 22 can act as stops in opposite axial directions, thus reducing weight-on-bit ("WOB") at initial contact between the bit and well bottom. The fixed collar 23 and retainer 22 can provide a gentler cycle or lower impact cycle when touching bottom by compressing the springs, instead of a more solid hit.

In some examples, the one or more inner grooves 11a on the outer tubular body 10 can work in conjunction with outer grooves 11b on the inner tubular body 13 to act as guides for ball bearings or balls 14. The balls 14 can be located in the grooves 11a, 11b, thus engaging both the outer tubular body 10 and the inner tubular body 13 at the same time. This configuration provides relative axial and torsional movement with reduced friction, thus making the tool more sensitive and responsive to torque changes on the drilling assembly.

According to some embodiments, centering springs 15 may serve to preserve spacing or otherwise position one or more of the plurality of balls 14 in proper position to allow their non-restricted movement during the relative movement of the inner and outer tubular bodies 13, 10. The centering springs 15 can be pushed into the grooves 11a, 11b and can follow the same path as the balls 14. This particular version does not allow circulation of the balls. Rather, the balls 14 can just roll up and down and push up against the centering springs 15. As the outer tubular body 10 moves relative to the inner tubular body 13, the balls 14 can roll and push up against each centering spring 15, whether it is in the up stroke or the down stroke.

One or more spring retainers 16 may be configured to hold the centering springs 15 in the desired position(s). The spring retainers 16 can be mounted to the lower sub, perpendicular to the axis of the tool. Basically, the spring retainers 16 can be mounted to the lower sub, perpendicular to the axis of the tool. They can act to terminate the grooves 11a, 11b on both sides of the grooved pair.

A load nut 17 (FIGS. 1A, 2A and 3), according to some embodiments, provides the full pulling load of the tool (e.g., the weight of the entire bottom hole assembly, or BHA) and may be configured to transfer upward load from the drilling assembly to spring assemblies 18 and 19. The load nut 17 can support the full tension load of the entire tool. The load nut 17 can hold the tool together when pulling the entire BHA out of the borehole.

Spring assembly 18, according to some embodiments, is a "hard" spring assembly configured to provide full load on the drilling assembly. Spring assembly 19, according to some embodiments, is a "soft" spring assembly configured to provide soft drill assembly engagement when the drill approaches well bottom. The same can be true for spring assemblies 24, 25. Both springs assemblies 18 and 19, according to some embodiments, are configured to act in the same axial direction. By manipulating the properties of the combination of springs assemblies 18 and 19, appropriate load curves may be achieved to meet specific drilling requirements, environments, or conditions.

According to some embodiments, the sliding coupling 20 connects hard spring assembly 18 and the soft spring assembly 19, which prevents overloading the soft spring assembly 19.

An upper sub 21 (FIGS. 1A and 2A), according to some embodiments, limits the movement of the sliding coupling 20 to prevent the soft spring assembly 19 from overloading. Alternatively, some embodiments (FIG. 2A) include the retainer 22, collar 23, upper spring assembly 24 and lower spring assembly 25. Typically, only two different types of Belleville springs are used so they can be configured by the way they are stacked in the tool or by the thicknesses. For example, spring assemblies 18 and 19 can be used in the tool configuration shown of FIG. 1. They are arranged to act in the same direction providing progressive load curves. Spring assemblies 24 and 25 can be used in the tool configuration of FIG. 2. They are arranged to act in opposite directions to provide softer initial contact between the bit and the well bottom.

According to some embodiments (FIGS. 5A-5D), the inner tubular body 13 with the inner tubular body extension 13a may contain two or more closed loop grooves 27. One or more of the grooves 27 can include four sections: a groove section 27a for coupling with or complementing inner grooves 11a on the outer tubular body 10 and providing engagement between the outer tubular body 10 and the inner tubular body 13; a groove section 27b may be configured deeper than groove section 27a to allow the balls 14 to recirculate according to some embodiments; and two transitional grooves 27c can connect groove sections 27a and 27b. The groove sections 27a, 27b and 27c can be contiguous and uninterrupted so that the balls 14 flow smoothly through them.

According to some embodiments (FIGS. 5C-6C), an outer tubular body 28 can include a plurality of closed loop grooves 29 and the shoulder 12 with the fluidic diode 12a. In some embodiments, the outer and inner tubular bodies 10, 13 may include two or more spring assemblies 18 and 19 (FIGS. 1A and 1B) arranged by sliding one or more sliding couplings 20 to act in the same direction, thus providing a customizable load curve on the drilling assembly. In other embodiments, two spring assemblies 24 and 25 (FIGS. 2A and 2B) may be arranged by the fixed collar 23 and retainer 22 coupled to the inner tubular body extension 13a to act in opposing directions, thus reducing WOB at initial contact between the bit and well bottom.

According to some embodiments, each closed loop groove 29 may include four sections: a groove section 29a (FIGS. 6B and 6C) that couples with or complements grooves 11b (via balls 14) on the inner tubular body 13 and provides engagement between the outer tubular body 28 and the inner tubular body 13; groove section 29b according to some embodiments may be deeper than groove section 29a and allow ball recirculation; and two transitional grooves 29c that connect the groove sections 29a and 29b, according to some embodiments.

In particular, FIGS. 1A and 1B illustrate a cross-sectional view of a tool according to some embodiments of this disclosure. The tool can include grooves on the outer tubular body and the inner tubular body. Balls are positioned within a cavity formed by the complementary grooves on opposite surfaces. In some embodiments, centering springs may be used to keep the balls in position, and centering spring retainers can be used to position the centering springs. Load springs may be arranged to act in the same direction providing progressive load curves.

FIGS. 2A and 2B illustrate a cross-sectional view of a tool according to some embodiments of this disclosure. The tool can include grooves on the outer tubular body and the inner tubular body. A plurality of balls can run in the cavity formed by the grooves and engage both tubular bodies, allowing relative movement axially and torsionally. The balls may be kept in position using centering springs and centering spring retainers. According to some embodiments, load springs can be arranged to act in opposing directions from each other, providing lighter initial WOB.

Figure 3:
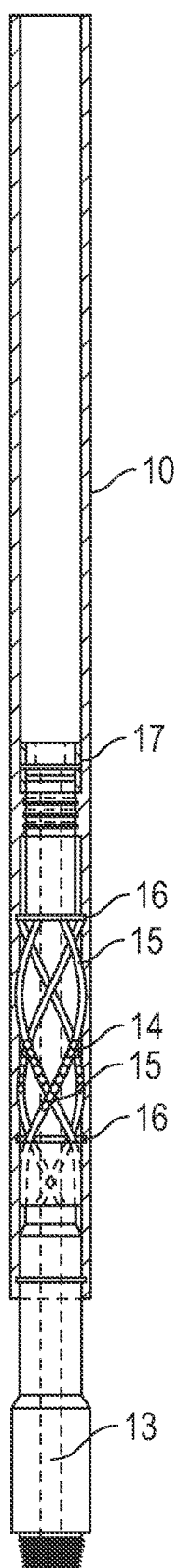
FIG. 3 is a sectional side view of a lower portion of a downhole tool according to some embodiments of this disclosure, in an extended configuration.

FIG. 3 shows a detailed lower section including a groove and ball arrangement as described in more detail above. FIG. 4 shows a more detailed view of the outer and inner tubular bodies as described in greater detail above.

FIGS. 5A-5D show a tool with the inner tubular body comprising multiple closed loop grooves for recirculation of the plurality of balls, and an outer tubular body with grooves as described in detail above.

Figure 6A:
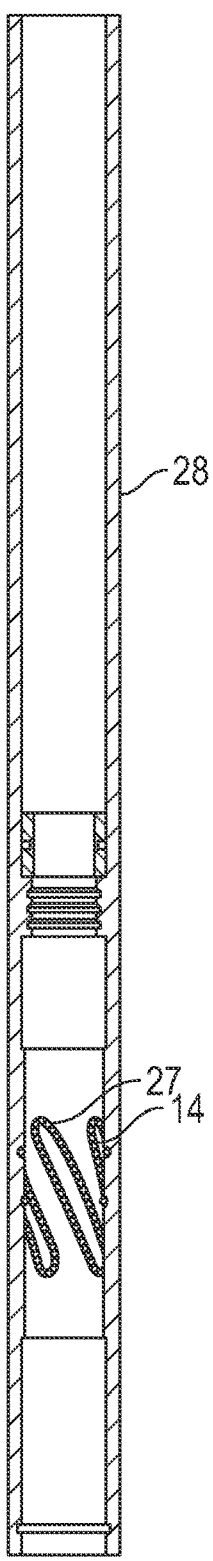
FIGS. 6A and 6B are sectional side views of an embodiment of a downhole tool having an outer tubular body with internal grooves for recirculation of the balls, and an inner tubular body with outer grooves for the balls.
Figure 6B:
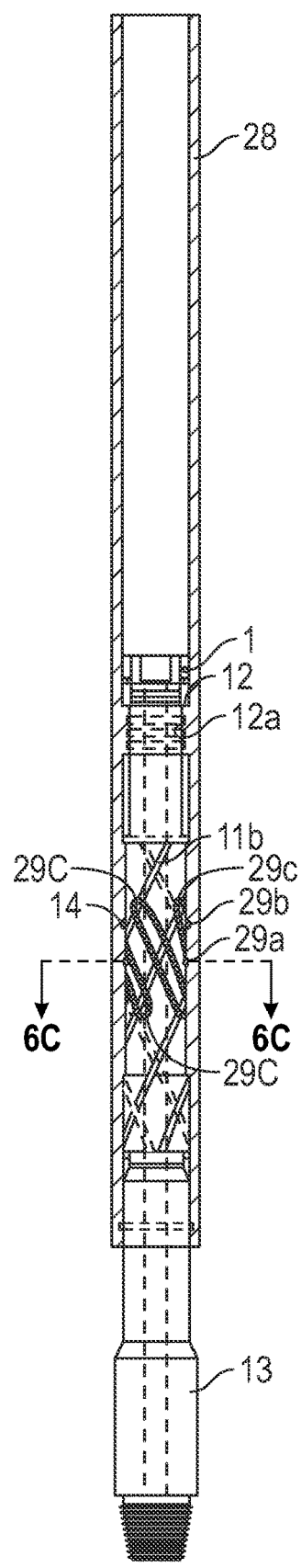
Figure 6C:
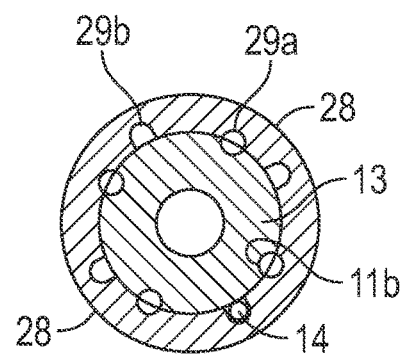
FIG. 6C is sectional view of the downhole tool of FIG. 6B, taken along the line 6C-6C in FIG. 6B, according to some embodiments of this disclosure.

FIGS. 6A-6C show a tool with the outer tubular body including multiple closed loop grooves for recirculation of the plurality of balls, and an inner tubular body with grooves as described in detail above.

Still other embodiments can include one or more of the following items.

1. A downhole apparatus, comprising:
   an outer body that is cylindrical and comprises an axis and a top coupling that is configured to couple the downhole apparatus to a drill string, and outer grooves formed in an exterior of the inner body;
   an inner body that is cylindrical and positioned at least partially within the outer body, the inner body has a bottom coupling configured to couple to another portion of the drill string, and inner grooves formed in an interior of the inner body;
   springs positioned within the downhole apparatus and configured to transmit an axial force to a cutting element of the drill string;
   balls configured to travel within the inner and outer grooves, with at least some of the balls simultaneously engaging the interior of the outer body and the exterior of the inner body.
2. The downhole apparatus wherein the inner and outer grooves are configured for recirculation of the balls.
3. The downhole apparatus further comprising a fluidic diode coupled to the inner and outer bodies for dampening axial motion therebetween.
4. The downhole apparatus further comprising a centering spring positioned adjacent to the balls for stabilizing and maintaining positions of the balls in the inner and outer grooves.
5. The downhole apparatus wherein the springs are arranged with a sliding coupling to act in a same axial direction, and the sliding coupling prevents overloading of a softer one of the springs.
6. The downhole apparatus further comprising an upper sub mounted to the downhole apparatus to limit movement of the sliding coupling to prevent the softer one of the springs from overloading.
7. The downhole apparatus further comprising a spacer to preload the springs.
8. The downhole apparatus wherein the springs further comprise a fixed collar and a retainer coupled to an extension of the inner body, wherein the fixed collar provides a preload on the springs and compresses the springs.
9. The downhole apparatus wherein the retainer comprises seals to retain oil, and the fixed collar and the retainer are stops in opposite axial directions.
10. The downhole apparatus further comprising centering springs for positioning the balls in the inner and outer grooves.
11. The downhole apparatus further comprising spring retainers to secure the centering springs in desired positions and terminate the inner and outer grooves, where the spring retainers are mounted to a lower sub in the downhole system.
12. The downhole apparatus further comprising a load nut mounted to the downhole apparatus to transfer load from the drilling assembly to the springs.
13. The downhole apparatus wherein the springs have different spring stiffnesses.
14. The downhole apparatus wherein the inner and outer grooves are closed loop grooves, each having groove sections including transitional groove sections.
15. The downhole apparatus wherein depths of at least one of the groove sections differs from the others to recirculate the balls, and the groove sections are contiguous and uninterrupted so that the balls flow smoothly through them.
16. A downhole tool for dampening torsional shock and vibration of a drill string and drill bit, the downhole tool comprising:
an outer body having an axis and inner grooves formed in an interior surface thereof;
an inner body co-axially positioned at least partially within the outer body and axially movable relative to the outer body, the inner body having outer grooves are formed in an exterior surface thereof;
body springs coupled between the inner and outer bodies for regulation axial motion therebetween;
a fluidic diode coupled to the inner and outer bodies for dampening axial motion therebetween;
balls located in the inner and outer grooves, and the balls are configured to be recirculated in the inner and outer grooves; and
ball springs to secure the balls in the inner and outer grooves.
17. A method of using a downhole tool for dampening torsional shock and vibration of a drill string and drill bit, the method comprising:
coupling an outer body to the drill string, the outer body having an axis;
coupling an inner body to the drill bit, and the inner body is axially movable relative to the outer body;
spring biasing the inner and outer bodies relative to each other;
dampening axial motion of the inner and outer bodies;
recirculating balls between the inner and outer bodies to regulate axial motion therebetween.
18. The method wherein recirculating comprises moving the balls in grooves in the inner and outer bodies.
19. The method wherein dampening comprises using a fluidic diode.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:
1. A downhole apparatus, comprising:
an outer body that is cylindrical and comprises an axis and a top coupling that is configured to couple the downhole apparatus to a drill string, and inner grooves formed in an interior of the outer body;
an inner body that is cylindrical and positioned at least partially within the outer body, the inner body has a bottom coupling configured to couple to another portion of the drill string, and outer grooves formed in an exterior of the inner body;
springs positioned within the downhole apparatus and configured to transmit an axial force to a cutting element of the drill string;
balls configured to travel within the inner and outer grooves, with at least some of the balls simultaneously engaging the interior of the outer body and the exterior of the inner body; and
the inner and outer grooves are closed loop grooves, each having groove sections including transitional groove sections, depths of at least one of the groove sections differs from the others to recirculate the balls, and the groove sections are contiguous and uninterrupted so that the balls flow smoothly through them.

2. The downhole apparatus of claim 1, further comprising a fluidic diode coupled to the inner and outer bodies for dampening axial motion therebetween.

3. The downhole apparatus of claim 1, further comprising a centering spring positioned adjacent to the balls for stabilizing and maintaining positions of the balls in the inner and outer grooves.

4. The downhole apparatus of claim 1, wherein the springs are arranged with a sliding coupling to act in a same axial direction, and the sliding coupling prevents overloading of a softer one of the springs.

5. The downhole apparatus of claim 4, further comprising an upper sub mounted to the downhole apparatus to limit movement of the sliding coupling to prevent the softer one of the springs from overloading.

6. The downhole apparatus of claim 4, further comprising a spacer to preload the springs.

7. The downhole apparatus of claim 1, wherein the springs further comprise a fixed collar and a retainer coupled to an extension of the inner body, wherein the fixed collar provides a preload on the springs and compresses the springs.

8. The downhole apparatus of claim 7, wherein the retainer comprises seals to retain oil, and the fixed collar and the retainer are stops in opposite axial directions.

9. The downhole apparatus of claim 1, further comprising centering springs for positioning the balls in the inner and outer grooves.

10. The downhole apparatus of claim 9, further comprising spring retainers to secure the centering springs in desired positions and terminate the inner and outer grooves, where the spring retainers are mounted to a lower sub in the downhole system.

11. The downhole apparatus of claim 9, further comprising a load nut mounted to the downhole apparatus to transfer load from the drilling assembly to the springs.

12. The downhole apparatus of claim 9, wherein the springs and the centering springs have different spring stiffnesses.

13. A downhole tool for dampening torsional shock and vibration of a drill string and drill bit, the downhole tool comprising:

an outer body having an axis and inner grooves formed in an interior surface thereof;

an inner body co-axially positioned at least partially within the outer body and axially movable relative to the outer body, the inner body having outer grooves formed in an exterior surface thereof;

body springs coupled between the inner and outer bodies for regulating axial motion therebetween;

a fluidic diode coupled to the inner and outer bodies for dampening axial motion therebetween;

balls located in the inner and outer grooves, and the balls are configured to be recirculated in the inner and outer grooves; and centering springs to secure the balls in the inner and outer grooves.

14. A method of using a downhole tool for dampening torsional shock and vibration of a drill string and drill bit, the method comprising:

coupling an outer body to the drill string, the outer body having an axis;

coupling an inner body to the drill bit, and the inner body is axially movable relative to the outer body;

spring biasing the inner and outer bodies relative to each other;

dampening axial motion of the inner and outer bodies;

recirculating balls between the inner and outer bodies to regulate axial motion therebetween; and the outer and inner bodies comprise inner and outer grooves, respectively, that are closed loop grooves, each having groove sections with transitional groove sections, a depth of at least one of the groove sections differs from the others to recirculate the balls, and the groove sections are contiguous and uninterrupted so that the balls flow smoothly through them.

15. The method of claim 14, wherein recirculating comprises moving the balls in the groove sections in the inner and outer bodies.

16. The method of claim 14, wherein dampening comprises using a fluidic diode.

* * * * *

UNITED STATES PATENT AND TRADEMARK OFFICE
CERTIFICATE OF CORRECTION

| | | |
|---|---|---|
| PATENT NO. | : 11,873,686 B2 | Page 1 of 1 |
| APPLICATION NO. | : 18/110116 | |
| DATED | : January 16, 2024 | |
| INVENTOR(S) | : Harvey et al. | |

It is certified that error appears in the above-identified patent and that said Letters Patent is hereby corrected as shown below:

In the Claims

Claim 10, Line 34, "downhole system" should be -- downhole apparatus --;

Claim 11, Line 37, "drilling assembly" should be -- drill string --.

Signed and Sealed this
Ninth Day of April, 2024

Katherine Kelly Vidal
*Director of the United States Patent and Trademark Office*